United States Patent
Chakraborty et al.

(10) Patent No.: US 9,378,120 B2
(45) Date of Patent: *Jun. 28, 2016

(54) AUTOMATED TEST EXECUTION PLAN DERIVATION SYSTEM AND METHOD

(71) Applicant: Tata Consultancy Services Limited, Maharashtra (IN)

(72) Inventors: Soham Sundar Chakraborty, West Bengal (IN); Vipul Shah, Maharashtra (IN)

(73) Assignee: Tata Consultancy Services Limited, Maharashtra (IN)

( * ) Notice: Subject to any disclaimer, the term of this patent is extended or adjusted under 35 U.S.C. 154(b) by 552 days.

This patent is subject to a terminal disclaimer.

(21) Appl. No.: 13/658,402

(22) Filed: Oct. 23, 2012

(65) Prior Publication Data

US 2013/0117611 A1    May 9, 2013

(30) Foreign Application Priority Data

Nov. 9, 2011 (IN) .......................... 3168/MUM/2011

(51) Int. Cl.
G06F 11/36 (2006.01)

(52) U.S. Cl.
CPC ........ *G06F 11/3672* (2013.01); *G06F 11/3688* (2013.01)

(58) Field of Classification Search
CPC ............ G06F 11/3688; G06F 11/3676; G06F 11/3672; G01R 31/2882
USPC ...................... 714/25, 33; 717/124
See application file for complete search history.

(56) References Cited

U.S. PATENT DOCUMENTS

| | | | | |
|---|---|---|---|---|
| 5,371,883 A | * | 12/1994 | Gross et al. ................... | 714/38.1 |
| 5,928,334 A | * | 7/1999 | Mandyam et al. ............ | 709/248 |
| 6,023,773 A | * | 2/2000 | O'Donnell et al. ............ | 714/40 |
| 7,178,063 B1 | * | 2/2007 | Smith .................. | G06F 11/3688 714/38.1 |
| 7,506,312 B1 | * | 3/2009 | Girolami-Rose ......... | G06F 8/71 717/101 |
| 7,913,230 B2 | * | 3/2011 | Vikutan ........................ | 717/124 |
| 8,132,056 B2 | * | 3/2012 | Thakkar .............. | G06F 11/3676 714/38.1 |
| 8,549,522 B1 | * | 10/2013 | Chatterjee ........... | G06F 11/3664 718/102 |
| 8,645,341 B2 | * | 2/2014 | Salman et al. ................ | 707/695 |
| 8,799,868 B2 | * | 8/2014 | Ndem et al. ................... | 717/126 |
| 8,826,084 B1 | * | 9/2014 | Gauf ................... | G06F 11/3688 714/32 |
| 2002/0162059 A1 | * | 10/2002 | McNeely et al. ............. | 714/703 |

(Continued)

OTHER PUBLICATIONS

Sudarshan Banerjee, Elaheh Bozorgzadeh and Nikil D. Dutt, "Integrating Physical Constraints in HW-SW Partioning for Architectures With Partial Dynamic Reconfiguration", Nov. 2006, IEEE, vol. 14, No. 11, pp. 1189-1202.*

(Continued)

*Primary Examiner* — Loan L. T. Truong
(74) *Attorney, Agent, or Firm* — Ohlandt, Greeley, Ruggiero & Perle, LLP

(57) ABSTRACT

A system and method is disclosed that has the ability to automatically derive a test execution plan for parallel execution of test cases, while considering the complex dependencies across the test cases and preserving the semantics of test execution. The execution plan, so generated, provides for balanced workload distribution and scheduling of the test cases for improving the test execution cycles of the test suites in a cost effective manner.

14 Claims, 7 Drawing Sheets

(56) References Cited

U.S. PATENT DOCUMENTS

| | | | |
|---|---|---|---|
| 2005/0144581 A1* | 6/2005 | Imai | G06F 17/5045 716/105 |
| 2005/0223361 A1* | 10/2005 | Belbute | 717/124 |
| 2005/0235263 A1* | 10/2005 | Bundy et al. | 717/124 |
| 2007/0094542 A1* | 4/2007 | Bartucca | G06F 11/3672 714/38.1 |
| 2007/0168744 A1* | 7/2007 | Pal et al. | 714/38 |
| 2007/0220341 A1* | 9/2007 | Apostoloiu | G06F 11/3684 714/33 |
| 2008/0109475 A1* | 5/2008 | Burmester et al. | 707/102 |
| 2008/0120521 A1* | 5/2008 | Poisson et al. | 714/26 |
| 2008/0163003 A1* | 7/2008 | Mehrotra | 714/38 |
| 2008/0256392 A1* | 10/2008 | Garland | G06F 11/263 714/33 |
| 2009/0254887 A1* | 10/2009 | Rossi et al. | 717/126 |
| 2009/0300626 A1* | 12/2009 | Sturdy | 718/102 |
| 2010/0333073 A1* | 12/2010 | Mills | 717/131 |
| 2011/0066490 A1* | 3/2011 | Bassin | G06Q 10/06 705/14.48 |
| 2011/0088014 A1* | 4/2011 | Becker et al. | 717/125 |
| 2011/0208683 A1* | 8/2011 | Shimony et al. | 706/52 |
| 2011/0231708 A1* | 9/2011 | Lawrance et al. | 714/38.1 |
| 2012/0110591 A1* | 5/2012 | Ghosh | G06F 11/3604 718/104 |
| 2012/0123825 A1* | 5/2012 | Biran et al. | 705/7.36 |
| 2012/0151455 A1* | 6/2012 | Tsantilis et al. | 717/132 |
| 2012/0291013 A1* | 11/2012 | Fisher | 717/124 |
| 2012/0297163 A1* | 11/2012 | Breternitz et al. | 712/22 |
| 2013/0042222 A1* | 2/2013 | Maddela | G06F 8/70 717/124 |
| 2013/0097586 A1* | 4/2013 | Chandra | G06F 11/3684 717/124 |
| 2013/0174178 A1* | 7/2013 | Chakraborty et al. | 718/105 |

OTHER PUBLICATIONS

Xiang, Dong, "Test scheduling using test subsession partitioning," Inst. of Comput. Technol., Acad. Sinica, Beijing, pp. 63-68, Nov. 1994 (Abstract only).

* cited by examiner

| Case Studies | No. of Regression Test Cases | Regression Test Cycle Frequency (weeks) | Team Size | Regression Test Cycle (days) | Total Execution Time (hours) |
|---|---|---|---|---|---|
| BA | 187 | 2 | 3 | 2 | 36 |
| WUB | 261 | 12 | 2 | 10 | 93.8 |
| FA | 99 | 12 | 3 | 5 | 94.2 |
| EC | 83 | 4 | 3 | 1.5 | 13 |
| HRMS | 50 | 12 | 2 | 3 | 22.8 |

Figure 4

| Case Studies | No. of Disconnected Components (Sub-graphs) | Range(Min, Max) | Weights Distributions of components (mins) | |
|---|---|---|---|---|
| | | | Average | Standard Deviation |
| BA | 22 | 15,300 | 98.2 | 81.3 |
| WUB | 35 | 70,260 | 156.4 | 70.9 |
| FA | 98 | 40,75 | 57 | 15.7 |
| EC | 41 | 5,170 | 19.0 | 30.6 |
| HRMS | 16 | 20,655 | 85.3 | 154.4 |

Figure 5

| Case Studies | Actual (Mins) | PNSDC (Mins) | PSDC (Mins) | PSTS (Mins) |
|---|---|---|---|---|
| BA | 720 | 240 | 240 | 240 |
| WUB | 2820 | 120 | 120 | 120 |
| FA | 1890 | 75 | 75 | 75 |
| EC | 260 | 21 | 21 | 60 |
| HRMS | 684 | 49 | 49 | 50 | ional test execution plan derivation in context of paralleliza-
AUTOMATED TEST EXECUTION PLAN DERIVATION SYSTEM AND METHOD

FIELD OF THE INVENTION

The present invention generally relates to the field of software testing and verification and, more particularly, to automated test execution plan derivation in context of parallelization of test suites.

BACKGROUND OF THE INVENTION

In industrial test and maintenance projects, test execution plans are important for performing test cycle in a time constrained manner with the objective of delivering the expected quality by effective utilization of resources. Regression testing is an important phase in software test Life cycle and contributes significantly in day-to-day operations in industrial software systems. Executing the test cases of the regression test suite repetitively for each change is a resource-and-time-intensive process. With ever reducing test cycle times, test teams face tremendous pressures to complete regression testing in time and budget, often compromising on quality.

Test teams distribute test cases among multiple resources to execute them in parallel.

To achieve this, it is important to have an execution plan that simplifies work load distribution and guarantees that expected outcomes of the tests do not change in spite of parallelism. In practice, these plans are often created based on the understanding and experiences of the testers. But due to various dynamic parameters such as regression suite sub setting for a particular change, varying team size, immediate release requirements and abends, the static plans often fail to provide effective guidance, and needs to be amended. The concept of parallel execution of test case has been explored in prior arts where the specified test cases have been executed in parallel. Some have also utilized cloud frameworks to achieve testing in parallel and distributed manner. However, all these approaches require the execution plan to be specified by the test designers.

There often exist dependencies across the test cases that determine the order of execution and are required to be preserved during the executions. Out-of-order execution of these test cases may lead to unexpected results. Analysis of failures to attribute the cause to, either a defect in the program or incorrect state of the system is time-consuming and defeats the purpose of parallelism. Dependencies are prevalent in scenario-based testing of database applications and GUI systems where dynamically created UI elements (e.g. webpages, screens, etc) are tested in a particular sequence. Apart from the application functionalities and persistence data accesses in collaborative testing, test data reuse also creates dependencies across test cases. In all these cases, an execution plan must oblige to the dependencies and sequences, while exploiting the parallelism across the test cases.

An attempt has been made in the past to identify impact of test case execution sequences and partition test cases based on state preservation by resetting the states. However, all these approaches assume that on reported failure, state can be reset and all test cases can start from the initial state. State resets can be expensive and the assumption that all test cases start from same initial state may not hold true. The option of clustering test cases in of resource constraints has also been explored, but failed as it does not consider the dependence across the test cases.

An effective step towards addressing this problem is to dynamically generate a test execution plan that is derived using balanced partitioning and scheduling techniques and is based on the cost of executions of the test cases. The plan shall be capable of facilitating parallel execution of test cases within available resources, and considering the test case dependencies.

OBJECTS OF THE INVENTION

The principle object of the present invention is to provide a system and method for deriving a test plan to facilitate parallel execution of test cases.

Another significant object of the invention is to generate a dynamic test plan capable of facilitating concurrent execution of test cases using available set of resources.

It is another object of the present invention to provide a test plan that enables parallel execution of the test cases while taking into account test execution order and preserving the semantics of execution.

Another object of the invention is to provide an effective method of deriving an execution plan that is capable of executing the test cases of the regression test suite in the most cost effective and time conserving way by introducing parallelism.

Yet another object of the invention is to provide an execution plan that is derived using balanced partitioning and scheduling techniques and based on the cost of executions of the test cases.

Yet another object of the invention is to derive test plan for parallel test execution that takes into account dependencies between test cases.

Still other object of the present invention is to generate an execution plan for varying resources, where corresponding test execution plans are generated for each resource that ensure no conflicts during execution.

The other major object is to derive an execution plan that can lead to better resource utilization and shorter test cycles.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosures. It is also to be understood that the terminology used in the description is for the purpose of describing the particular versions or embodiments only, and is not intended to limit the scope of the present invention which will be limited only by the appended claims.

The present invention envisages a system and method for test execution plan derivation which is directed towards parallel execution of test cases in a dynamic environment that takes into account dependencies across these test cases.

In the preferred embodiment of the invention a method implemented in a computer infrastructure having computer executable code tangibly embodied on a computer readable storage medium for automatically deriving a test execution plan is provided that is capable of facilitating concurrent execution of test cases in a dynamic environment, the said method comprising:

receiving of a plurality of a user specified test cases and corresponding user-configured specification;

extracting associated dependence and a directed dependence graph dynamically across the plurality of test cases for creating one or more scheduled or non scheduled disconnected components;

creating partitions across the created disconnected components wherein all the test cases across the said components in a partition are balanced based on corresponding component weights for the non scheduled disconnected components and all the test cases within the component are balanced based on corresponding component's effective weight for the scheduled disconnected components; and automatically deriving the test execution plan from the balanced partition components.

One of the other preferred embodiments of the present invention presents a test plan management system for automatically deriving a test execution plan facilitating concurrent execution of test cases in a dynamic environment, the said system comprising: an input module for receiving a plurality of a user specified test cases and corresponding user-configured specification;

a dependency module configured to collaborate with the input module for extracting associated dependence and generating a directed dependence graph dynamically across the plurality of test cases for creating one or more disconnected components;

a partitioner adapted to receive the associated dependencies from the dependency module for creating partitions across the created disconnected components wherein all the test cases across the said components in a partition are balanced based on corresponding component weights for the non scheduled disconnected components and all the test cases within the component are balanced based on corresponding component's effective weight for the scheduled disconnected components;

a scheduler capable of scheduling the disconnected components for determining an order of execution; and a user interface to display an automatically derived test execution plan from the balanced partition components thereof.

BRIEF DESCRIPTION OF THE DRAWINGS

The foregoing summary, as well as the following detailed description of preferred embodiments, are better understood when read in conjunction with the appended drawings, wherein like elements are given like reference numerals. For the purpose of illustrating the invention, there is shown in the drawings example constructions of the invention; however, the invention is not limited to the specific methods and system disclosed. In the drawings:

FIG. 4 shows details of test execution of different test cases during regression testing in accordance with a disclosed embodiment of the invention.

FIG. 5 is a tabular representation of disconnected components identified from the dependence graph in accordance with a disclosed embodiment of the present invention.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms. Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

The present invention proposes a system and a method capable of deriving test execution plan for parallel test execution taking into consideration complex dependencies between the test cases. The goal of test plan derivation is to distribute the set of test cases across the available resources such that dependencies across the test cases are not violated. Given a set of test cases TS={$TC_1$; $TC_2$; : : : ; $TC_n$}; and the set of dependencies {$d_{(1;2)}$; $d_{(1;3)}$; : : : ; $d_{(i;j)}$} where the dependency d(1;2) is defined as $TC_1$ depends on $TC_2$, the objective of the present invention is to create m partitions {$P_1$; $P_2$; : : : ; $P_m$} such that the work load distribution among m resources is balanced without violating the semantics of test executions. The test case execution time is used as the weight for each test case.

Figure 1:
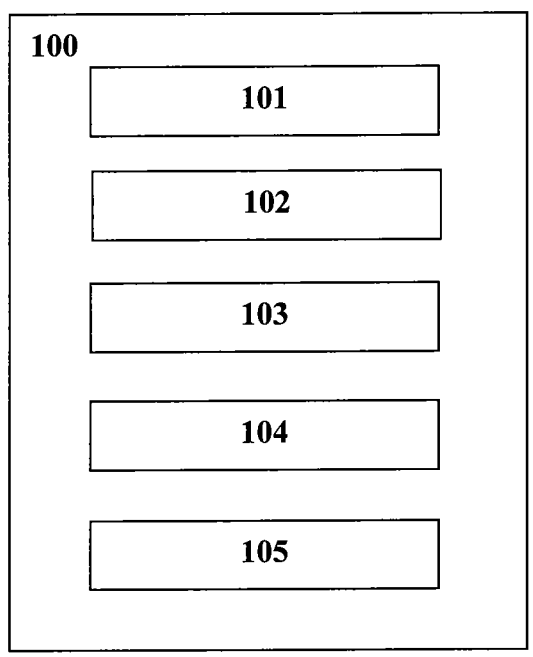
FIG. 1 illustrates block diagram of a test plan management system in accordance with one of the preferred embodiments of the present invention.

In accordance with one of the exemplary embodiments of the present invention, the method of deriving the test plan execution is presented wherein the test plan is directed towards parallel execution of test cases is performed by a test plan management system 100 shown in FIG. 1. The test teams can vary the number of resources and get the corresponding test execution plans for each resource so as to avoid conflicts during execution. The method, however, is based upon certain assumptions: a) a tester is considered as a resource; b) also the manual test execution and automated execution times are considered to be same; and c) a resource is assumed to start several threads of execution and no additional costs without expending any additional cost in executing multiple threads in parallel. Broadly, the steps constituting the derivation of test plan comprises of:

a) receiving the test cases along with their specifications inputted by the user;

b) extracting dependence and dependence graph construction;

c) applying a combination of partitioning and scheduling techniques to derive the test plan.

Figure 2:
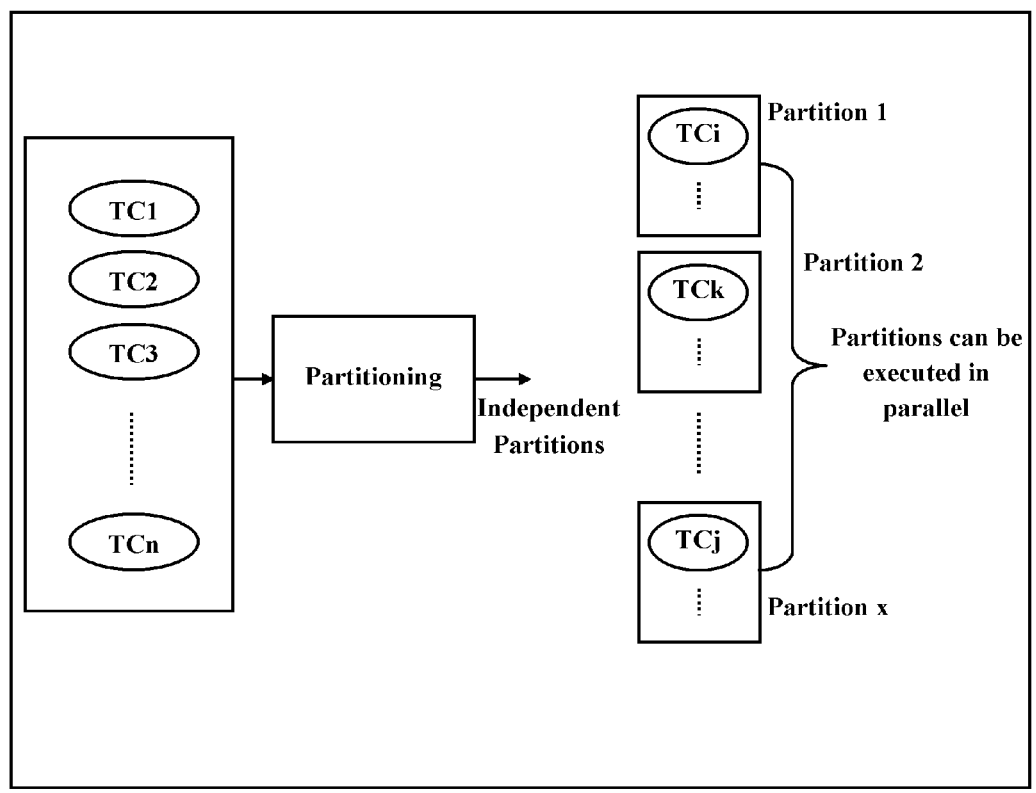
FIG. 2 shows multiple test cases that are partitioned and gets executed in parallel in accordance with one of the embodiments of the present invention.

The steps discussed above are broadly represented in FIG. 2 wherein plurality of test cases TC1, TC2, ... TCn are partitioned to constitute independent test case partitions that gets executed in parallel and are detailed here below for enabling the person skilled in the art to perform the invention without undue experimentation.

a) Receiving the user inputted information: A specification consisting of the information on the test cases is taken as an input from the user by an input module 101 of the system 100 in FIG. 1. The information received from the user comprises of persistent data accesses while a test case is being executed, the test cases on which it depends and the test cases which are dependent on this test case and execution time for the test case. It is observed that the dependencies across test cases results largely from persistent data accesses and these have been classified as follows:

Functional Sequence: There exists a sequence of operations whereby functionality becomes relevant only after the execution of some other functionality. For example, account has to be created before deposit and withdrawal functions can be tested or for example overdraft functionality can be tested only after series of withdrawal. These are in some sense intended dependencies and cannot be modified.

Data Reuse: Testers repeatedly use data for a class of test cases. For example, to get a certain profile of customer (say high net individual), the same customer id is used across several tests. This again introduces dependencies.

Shared Data Accesses: At times testers, to reduce test data creation effort, reuse data from previous test cases creating implicit dependencies.

User Interface Structure: In GUI systems, UI elements are created dynamically and get exposed to the user in certain sequence. If two test cases $TC_1$ and $TC_2$ test certain functionalities at $Page_1$ and $Page_2$ respectively, due to sequence of $Page_1$ and $Page_2$, $TC_2$ is executed after $TC_1$. This introduces implicit sequence among the test cases.

b) Extracting dependence and dependence graph construction: Once the user specified test cases along with their specification is received by the input module 101, a dependency module 102 communicates with the input module 101 to extract dependencies from the inputted specifications, as follows:

Dependence from persistent data accesses: If two test cases $T_1$ and $T_2$ access same persistent data field v and one of them perform a write operation on v, then the test cases are dependent with respect to v. In such a case, considering sequential execution order, we consider $T_2$ dependent on $T_1$.

Dependence from specified sequence: In this case specified sequence can be directly considered as dependence.

Dependence Graph Construction: The dependencies are modeled as a directed graph $G=\{V, E\}$, V is the set of vertices where a vertex $v \in V$ represents a test case and E is the set of edges where an edge $e \in E$ between the vertices pair $<v_1; v_2>$ represents that $v_2$ is dependent or can only execute after the execution of $v_1$. An edge is annotated with the persistent data field due to which there exist dependencies across the test cases.

c) Applying a combination of partitioning and scheduling techniques to derive the test plan: Individual steps in test plan derivation are described below. The disconnected components created from the dependency graph signify the subset of the independent test cases that can be executed in parallel. All the test cases that are found to be dependent on the other test case (s), together constitutes one component. Next, the partitioner 103 is employed to reduce most prevalent and classic NP-hard number partitioning problem, where the test execution times are considered as the set of numbers i.e. let S be a finite set of real numbers which indicates the execution costs for the components of the test cases. Now, the partitioner 103 uses greedy technique to achieve the needed partitioning across the disconnected components. The set S is partitioned in k subsets $A_1, A_2, \ldots, A_k$ such that $\text{Diff}(A_1, A_2, \ldots, A_k) = \max(\text{sum}(A_1), \text{sum}(A_2), \ldots, \text{sum}(A_k)) - \min(\text{sum}((A_1), \text{sum}(A_2), \ldots, \text{sum}(A_k)))$ is minimal where $\text{sum}(A_i) = \Sigma x$ where x is the element of partition $A_i$.

Next, a scheduler 104 is employed to maintain the order of executions of these dependent test cases and extract parallelism if any. However the problem of optimal scheduling is NP-Complete since the execution time of the test cases are non-uniform. Thus optimality is not assured in general. The scheduler selected for the purposes of present invention is static task scheduler. For static scheduling the test cases are distributed across a set of groupings or levels i.e. the test cases in level 1 can be executed safely once the test cases of level 1-1 are completed, creating a partial order amongst levels. Let V be of the total no. of test case-jobs executed across L levels and the execution time of test-jobs. $V_1$ is the set of n test-jobs at level 1 and $t_1; t_2; ::: t_n$ are the time required for the test-jobs. If all the test cases in $V_1$ are run in parallel then the execution time for level 1 is $T_{max}(1) = \max(t_1; t_2; ::: t_n)$. Thus the time required to complete the jobs is $\Sigma T_{max}(l_i)$, for all levels $l_i \in L$.

Figure 3:
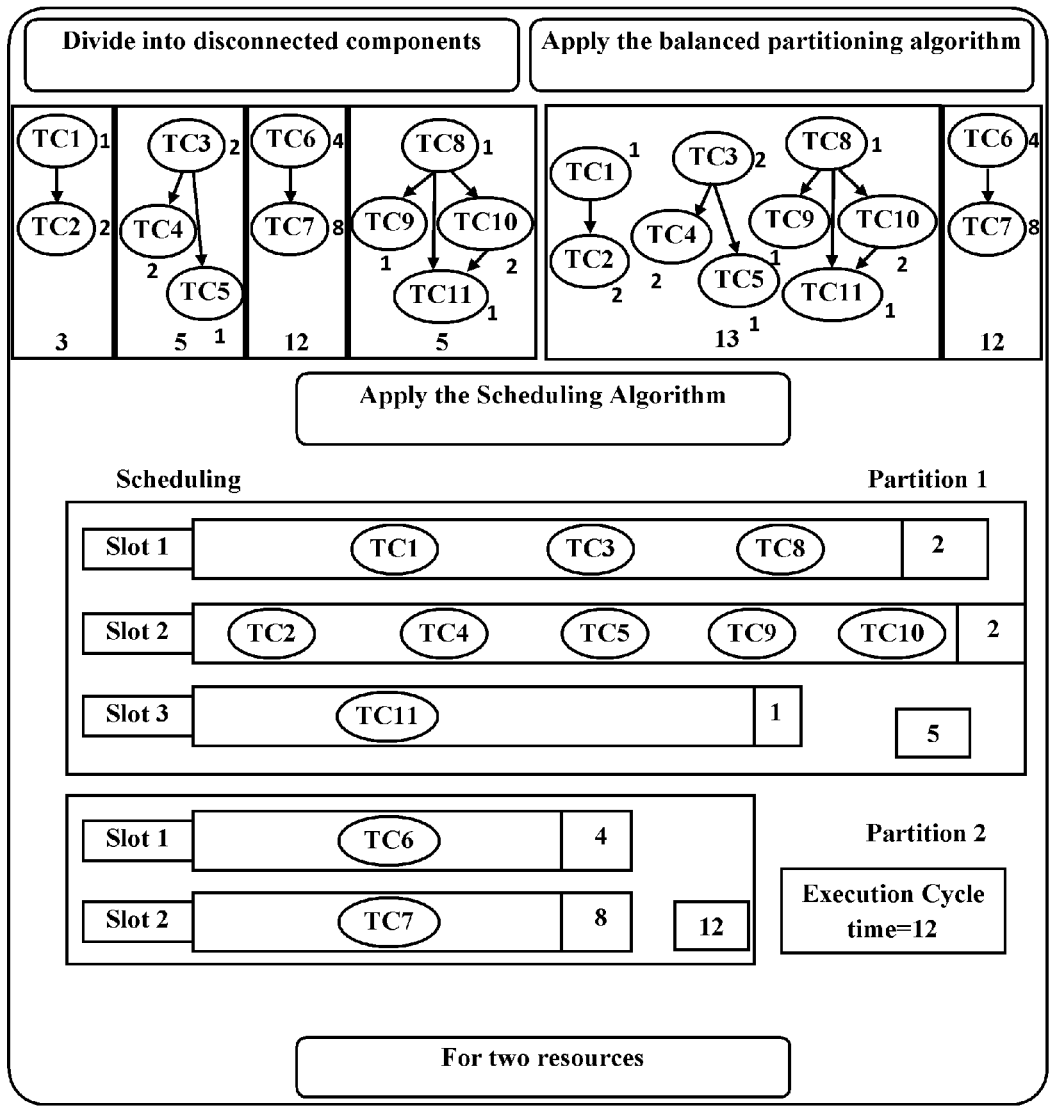
FIG. 3 represents the process flow of test execution using the PNSDC approach in accordance with one disclosed embodiment of the present invention.

The above discussed partitioning and scheduling techniques are considered to be applied under different scenarios, and to broadly cover all possible scenarios, three basic situations are considered for the purposes of this invention, as given below:

a) Partition Non Scheduled Disconnected Components
b) Partition Scheduled Disconnected Components
c) Partition After Scheduling the Test suite A combination of partitioning and scheduling approaches in a unique way is applied to above three scenarios in order to derive a novel test execution plan capable of improved balancing of workload across a given set of test cases without deviating from the semantics of their execution. The approach to realize the unique features and aspects of the present invention are discussed below:

a) Approach 1: Partition Non-scheduled disconnected components—PNSDC: Referring to FIG. 3, a dependence graph is created from test case dependencies provided by the user. Disconnected components are identified in the dependence graph. The initial weight of a disconnected component is the sum of weights of all test cases in the component. For the purposes of this invention, the approach is exemplified using FIG. 3. As shown in FIG. 3, test cases TC1 and TC2 constitutes one component having an initial component weight of three. Similarly, test cases TC3, TC4 and TC5 constitutes another disconnected component having an initial component weight of five; test cases TC6 and TC7 constitutes a third disconnected component having an initial component weight of twelve; and test cases TC8, TC9, TC10 and TC11 constitutes the fourth disconnected component having an initial component weight of five. For a given number of resources, which is two in the present example, equivalent number of balanced partitions is created with the disconnected components using component weights. In the present example of FIG. 3, two balanced partitions are created wherein the first partition comprises of test cases TC1, TC2, TC3, TC4, TC5, TC8, TC9, TC10, and TC11; and the second partition comprises of test cases TC6 and TC7. The weight of a partition is the sum of weights of all the components in that partition. Accordingly, the weight of first partition is 13 and second partition is 12 All the test cases across the components in a partition are then scheduled to uncover parallelism, maintaining the dependency between individual test cases. After applying the scheduling algorithm, it is identified that three slots are created for the first partition and two slots are created for the second partition. The slots represent the test cases that can be executed in parallel. Thus, test cases TC1, TC3 and TC8 can be executed in parallel and the corresponding execution cycle time for the same is two. Similar is the case for test cases TC2, TC4, TC5, TC9 and TC10 which can be executed in parallel with an execution cycle time of two while the test case TC11 is allotted a separate slot having execution cycle time of five. In all, the first partition now takes five execution cycles time once subjected to balanced partitioning and scheduling approach. Same is the case with second partition wherein separate slots are allotted to Test Cases TC6 and TC7 which takes twelve execution cycle time for task completion. Overall, the execution cycle time for the entire task is reduced to twelve using the first approach of balanced partitioning and scheduling. Partition weights are recomputed based on the scheduling and resulting parallelism. The resulting plan is the test execution plan.

b) Partition scheduled disconnected components—PSDC: A dependence graph is created from test case dependencies provided by the user. Disconnected components are identified in the dependence graph. The initial weight of a disconnected component is the sum of weights of all test cases in the component. All the test cases within a component, for every component are scheduled to uncover parallelism, maintaining the dependency between individual test cases. Component weights are recomputed based on the scheduling and resulting parallelism. For given number of resources, equivalent number of balanced partitions is created with the disconnected components with new weights, referred as effective weights. The resulting plan is the test execution plan.

c) Partition after Scheduling the Test suite—PSTS: A dependence graph is created from user given test case dependencies. All the test cases in the test suite are scheduled to uncover parallelism, maintaining the dependency between individual test cases that can be executed in parallel and a partial order is created amongst the groupings. For a given number of resources, equivalent number of balanced partitions is created from each group such that partitions are balanced. The resulting plan is the test derivation plan.

After executing the scheduling and balanced partitioning task, the resulting test case execution plan is presented via a user interface 105.

BEST MODE/EXAMPLE OF WORKING OF THE INVENTION

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

Turning now to FIG. 4, details of test execution of different test cases during regression testing is presented. It is evident from FIG. 4 that regression testing requires involved intense efforts from testers to achieve execution of test cases within assigned deadline. The data depicted in the figure is taken after several rounds of discussions with the dedicated project teams in order to understand the problems faced by the testers in a real time environment. For the purposes of this invention, data pertaining to number of regression test cases undertaken by individual project teams, regression test cycle frequency (in weeks), team size, regression test cycle (in days) and total test execution time, is gathered to bring forth the severity of problem faced at present. In accordance with one of the embodiments of the present invention five different test projects are selected—the details of the projects being:

BA: A core banking application
WUB: Web user behavior tracking application
FA: A financial service application
EC: An e-commerce application
HRMS: HRMS for a claims processing system For BA, FA, EC and CP, the test team performs functional and regression tests for new features and changes. Dependencies exist between test cases across functional modules and testers collaborate during testing to avoid conflicts. No automation framework is used and the test process is manual. WUB application monitors user interactions for a given website. It accumulates the user clicks on a page, analyzes the same and generates several reports. The test cases along with the test conditions are maintained in a test management framework and the testing process is manual.

After inputting specified test cases and associated specifications from the user at the input module 101, a dependency graph is constructed by the dependency module 102 before applying all the three approaches, PNSDC, PSDC and PSTS for test plan derivation. FIG. 5 represents weights (range, average weights and standard deviation observed) of disconnected components after the number of disconnected components was identified from the dependency graph. It is found that the weights of the disconnected components varied significantly across the projects, for example, WUB test suite reflected 35 disconnected components. Further, the weights of the components are found to vary in the range of 70 and 260. The average weight of the component is 156.4 and the standard deviation of the weights is 70.9. In case of FA projects, the number of components equaled the number of test cases. The test cases in these projects are designed so as to be independent of each other.

Figure 6:
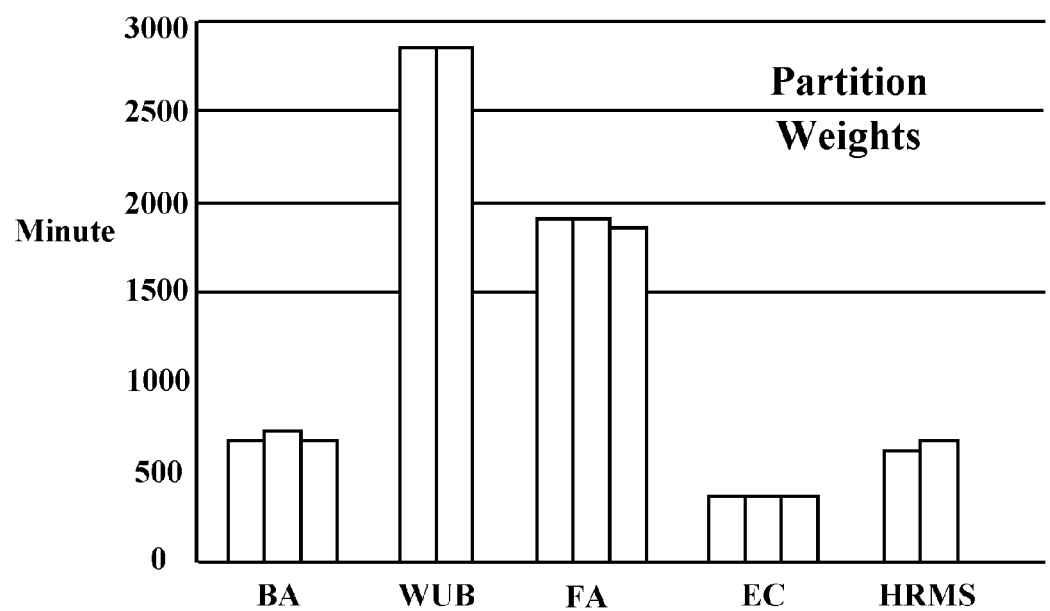
FIG. 6 is a graphical representation of partition weights for each resource using PNSDC approach in accordance with one of the disclosed embodiment of the present invention.
Figures 7, 8:
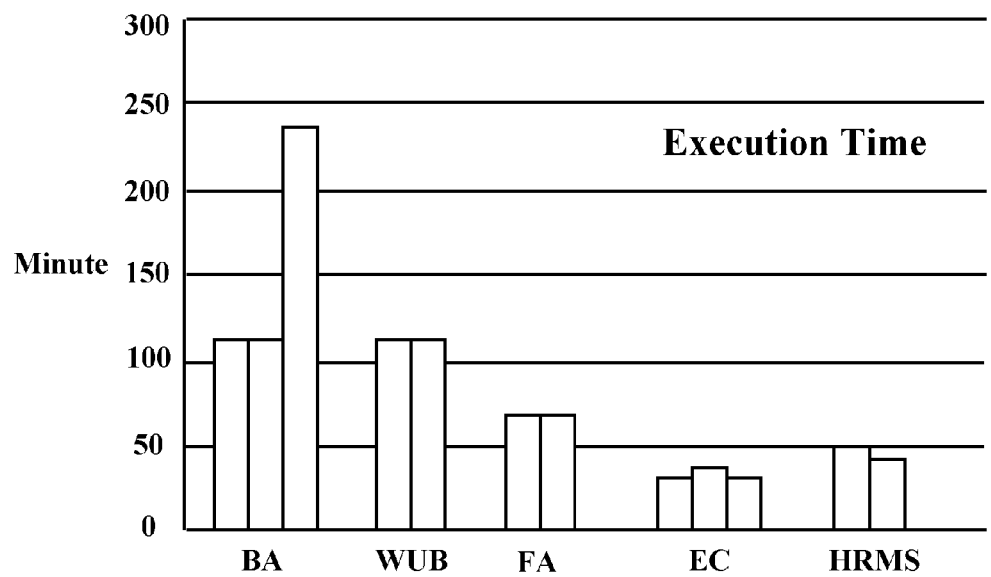
FIG. 7 is a graphical representation of execution times computed using PSDC approach for each resource in accordance with one of the disclosed embodiment of the present invention.
FIG. 8 is a representative screen display of comparison drawn on elapsed test execution time using PNSDC, PSDC and PSTS approach in accordance with one of the disclosed embodiments of the present invention.

Following the computing of component weights, all the three approaches are implemented upon the test cases by setting the total number of resources to be equal to the number of testers in the project. All the three approaches show different distributions for each partition. However, in all the cases, the partitions are found to be balanced. The partition weights for each resource using PNSDC approach is depicted in FIG. 6. Next, referring to FIG. 7 which shows the execution times computed using PSDC for each resource. FIG. 8 shows elapsed execution times using all the three approaches and compares the same with the actual elapsed time gathered from the project data. It is observed that the outcome on the execution times for each project did not vary significantly for different plans. Overall, significant savings in execution times with parallelism is observed as compared to data retrieved from projects, shown in FIG. 4.

The foregoing description of specific embodiments of the present invention has been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. The listing of steps within method claims do not imply any particular order to performing the steps, unless explicitly stated in the claim.

We claim:

1. A method implemented in a computer infrastructure having computer executable code embodied on a non-transitory computer readable storage medium for automatically deriving a test execution plan facilitating concurrent execution of test cases in a dynamic environment, comprising:
   receiving of a plurality of a user specified test cases and corresponding user-configured specification;
   extracting associated dependence and a directed dependence graph dynamically across the plurality of test cases for creating one or more scheduled or non scheduled disconnected components;
   creating partitions across the created disconnected components wherein all the test cases across the said components in a partition are balanced based on corresponding component weights for the non scheduled disconnected components and all the test cases within the component are balanced based on corresponding component's effective weight for the scheduled disconnected components; and
   automatically deriving the test execution plan from the balanced partition components, wherein the storage medium is a non-transitory computer readable storage medium,
   wherein the associated dependencies are derived from persistent data accesses, wherein the data accesses are of a functional sequence type, a data reuse type, a shared data type or a user interface structure type or a combination thereof.

2. The method of claim 1, wherein the user-configured specification comprises information on persistent data accesses during execution of the test case, plurality of test cases on which the test case depends, and one or more test cases which are dependent on the said test case along with their corresponding execution times.

3. The method of claim 1, wherein the extracted dependencies are modeled as the directed dependence graph, wherein the test cases are represented by vertices and the dependencies across the test cases are represented by edges of the said graph.

4. The method of claim 1, wherein the disconnected components in the dependence graph are subsets of independent test cases that can be executed in concurrence.

5. The method of claim 1, wherein the component weights are computed from the test case execution time.

6. The method of claim 1, wherein partitioning across the disconnected components is achieved using greedy technique.

7. The method of claim 1, wherein the non scheduled disconnected components are partitioned on their initial component weights determined before scheduling, the said initial weight being the sum of weights of all the test cases constituting the said component.

8. The method of claim 1, wherein all the scheduled disconnected components are partitioned on their effective weights, wherein computation of the effective weight comprises:
   determining initial weights of the components from their corresponding execution times;
   scheduling the components for defining an order of execution; and re-computing the component weights after scheduling to obtain the effective weights.

9. The method of claim 1, wherein the disconnected components are scheduled using a static task scheduling technique.

10. The method of claim 1, wherein the test execution plan is dynamically generated for executing the test cases concurrently while preserving semantics of test execution and the associated dependencies across the test cases.

11. A computer-implemented test plan management system for automatically deriving a test execution plan facilitating concurrent execution of test cases in a dynamic environment, comprising:
    a processor configured to execute instructions for automatically deriving a test execution plan;
    an input module, communicatively coupled to the processor, for receiving a plurality of a user specified test cases and corresponding user-configured specification;
    a dependency module configured to collaborate with the input module for extracting associated dependence and generating a directed dependence graph dynamically across the plurality of test cases for creating one or more disconnected components;
    a partitioner, communicatively coupled to the processor, adapted to receive the associated dependencies from the dependency module for creating partitions across the created disconnected components wherein all the test cases across the said components in a partition are balanced based on corresponding component weights for the non scheduled disconnected components and all the test cases within the component are balanced based on corresponding component's effective weight for the scheduled disconnected components; and
    a scheduler, communicatively coupled to the processor, capable of scheduling the disconnected components for determining an order of execution; and a user interface to display an automatically derived test execution plan from the balanced partition components thereof, wherein the test plan management system is a computer-implemented test plan management system.

12. The computer-implemented system of claim 11, wherein the input module receives user-configured specification comprising of information on persistent data accesses during execution of the test case; plurality of test cases on which the said test case depends; and one or more test cases which are dependent on the said test case along with their corresponding execution times.

13. The computer-implemented system of claim 11, wherein the partitioner achieves balanced partitions across the disconnected components by using greedy technique.

14. The computer-implemented system of claim 11, wherein the scheduler is a static task scheduler employed to create a schedule for execution of the test cases.

* * * * *